June 15, 1943.  B. E. SHAW  2,322,166
AIR VOLUME CONTROL
Filed April 14, 1941
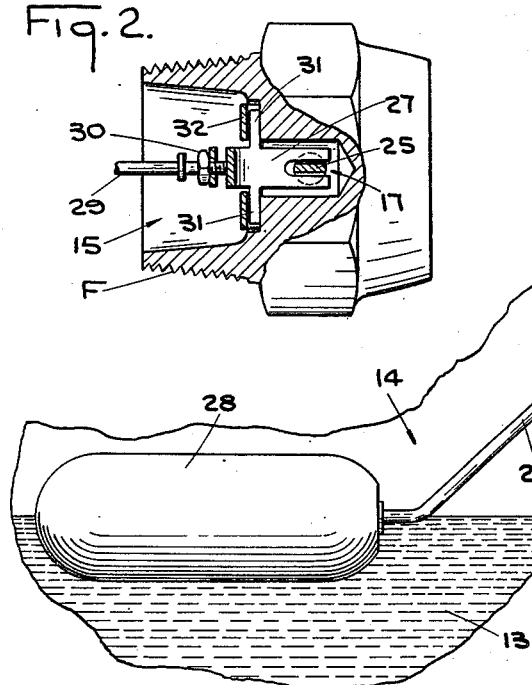
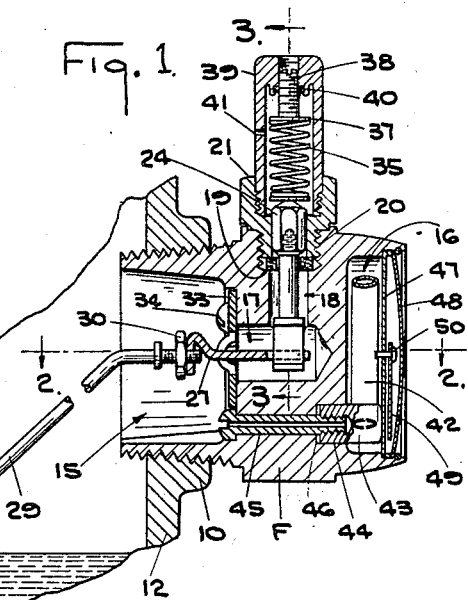
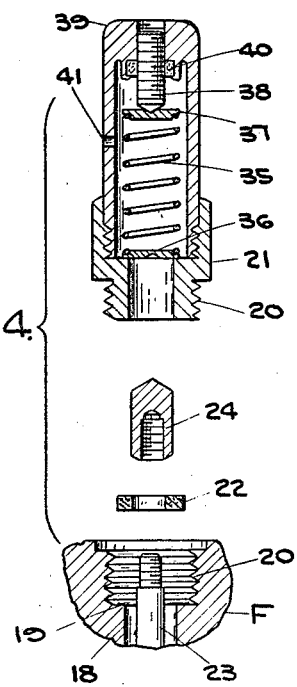
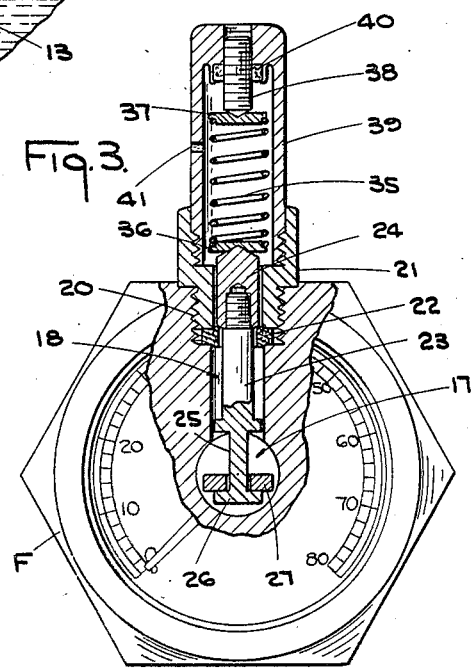
INVENTOR
BURTON E. SHAW
BY Bair & Freeman
ATTORNEYS Patented June 15, 1943

2,322,166

UNITED STATES PATENT OFFICE 2,322,166

AIR VOLUME CONTROL

Burton E. Shaw, Bristol, Ind., assignor to Penn Electric Switch Co., Goshen, Ind., a corporation of Iowa Application April 14, 1941, Serial No. 388,565

2 Claims. (Cl. 137—69)

My present invention relates to an air volume control device and particularly one of the deep well type such as disclosed in the co-pending application of Earnest F. Swanson, Serial No. 371,924.

One object of the invention is to provide an air volume controlling device in the form of a complete unit having a single valve which can be mounted in the wall of a water storage tank adjacent the water level therein and wherein the valve is responsive to both air pressure and water level within the tank.

Another object is to provide means to relieve air from the tank when the water level is low as a result of excess air in the pneumatic head of the tank yet prevent such relief of air when the working pressure within the tank is lower than a predetermined amount.

Still another object is to provide a simple and inexpensive unit in the form of a fitting which can be screwed into the wall of a tank and which includes a relief valve structure and a float so designed and associated with the relief valve that the float can be entered into the tank through the opening for the fitting and will control the relief valve so as to prevent its opening, except when the water level is low as a result of excess air in the tank.

Still a further object is to provide the relief valve of such construction and so mounted with respect to the fitting that a sleeve and cap may be removed for gaining access to the valve seat and the valve plug for renewing either or both and thereafter the sleeve and cap may be reinstalled with assurance that there is no change in the operating pressure due to an adjustable spring being carried by the sleeve and cap and it being unnecessary to change the position of the adjusting screw when renewing the valve plug or the valve seat.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1 is a vertical sectional view through my air volume controlling device showing it mounted in the wall of a hydropneumatic supply tank.

Figure 2 is a partial horizontal sectional view on the line 2—2 of Figure 1.

Figure 3 is an enlarged partial vertical sectional view on the line 3—3 of Figure 1.

Figure 4 is an exploded sectional view of portions of Figure 3 showing how such portions can be disassembled as when renewing or replacing the valve seat or valve plug.

In the equipping of deep well water systems with an automatic air volume controlling means, several problems arise. First of all, it is undesirable to provide a control device of the kind shown in Penn Patent No. 1,674,341, of June 19, 1928, which permits the water pump to take in air whenever air is necessary to replenish the pneumatic head within the water supply tank. In a deep well pumping system the pump must be located within twenty-five feet of the water in the well and cannot be mounted on the top of the ground. Therefore it is not feasible to run an air connection down to the pump. Instead it is desirable to have the pump take in air continuously while in operation and then bleed off the excess air from the water storage tank. In other systems, air is introduced into the tank by Venturi action, which would require bleeding off of excess air.

The operating pressure of a hydropneumatic pumping system varies, depending upon the setting of the automatic pressure responsive switch for controlling the pump motor. Usually the switch operates at a rather wide differential, for instance, "on" at 25 pounds' pressure and "off" at 45 pounds' pressure. Relief of air could be permitted in response to water level alone if it were not for the undesirable result of relief occurring at a time when the air pressure is low. From this standpoint, it is desirable to have a relief valve which would relieve air only when the pressure is high. Heretofore, a float valve and a relief valve in series have accomplished the desirable result of relieving pressure only when the water level is low and when the air pressure is high.

Specifically, my air volume controlling device includes a fitting F adapted to be screwed into a boss 10 of a water tank wall 12. The tank 12 is of the usual hydropneumatic type having water therein indicated at 13 and a pneumatic air head indicated at 14. The fitting F includes a body member having inner and outer cavities 15 and 16 and a central cavity 17 communicating with the cavity 15. Extending laterally and upwardly from the cavity 17 is a bore 18 having a shoulder at 19 and terminating in a threaded boss 20. Threaded in the boss 20 is a sleeve 21 adapted to be screwed down against a ring-like valve seat member 22. The member 22 also serves as a gasket to seal the lower end of the sleeve 21 relative to the fitting F.

Passing through the bore 18 and through the center of the seat member 22 is a valve stem member 23. Screwed onto the upper end of the stem is a valve plug 24. The lower end of the stem 23 is flattened as at 25 and its lower terminal end has a head 26 thereon.

Cooperating with the head 26 is a forked float lever or plate 27. The fingers of the forked plate 27 are adapted to contact with the head 26 as in Figure 3 wherever a float 28 is up. The float 28 is mounted on a float rod 29 screwed into the plate 27 and retained in position by a lock nut 30.

The float lever 27 has a pair of laterally extending pintles 31 which are oscillatably mounted in a pair of indentations 32 of a pivot plate or washer 33. The plate 33 is secured by screws 34 at the bottom of the cavity 15 of the fitting F. The float rod 29 is preferably curved or offset as illustrated to locate the float 28 well below the fitting F to prevent escape of water through the valve 22—24 when it is open.

A loading spring 35 is provided for the valve plug 24 and is mounted between followers 36 and 37. An adjusting screw 38 bears against the follower 37 and is threadably carried by a cap nut 39. A packing washer at 40 provides friction to hold the adjusting screw in any desired position. The cap 39 is provided with a vent opening at 41.

My air volume controlling device is readily adapted for a pressure gauge such as illustrated in Figure 1. This gauge may be of the usual Bourdon tube type. The tube being illustrated at 42 and having one end connected with a boss 43. The boss 43 enters a counter-bore 44 at the bottom of the cavity 16 and is retained in position in the cavity by a screw 45. The screw 45 is hollow so as to communicate pressure from the cavity 15 to the boss 43 with leakage being prevented by a gasket 46.

The dial of the pressure gauge is indicated at 47 and the cover glass thereof at 48. The indicating needle is shown at 49 and is mounted on a spindle 50 which is operatively connected with the Bourdon tube 42 in the usual manner such as illustrated in my copending application, Serial No. 300,815 filed October 15, 1939. The gauge as described is obviously well fitted for compact mounting within the fitting F without the necessity of having to provide a separate connection between the gauge and the tank 12.

*Practical operation*

Referring to Figure 1, a relatively low water level is shown indicating that the proportion of air and water in the tank is not normal, that is, there is too much air. Accordingly, the float 28 is low enough for the fingers of the float arm 27 to be lifted away from the upper surfaces of the head 26 of the valve stem 23. Accordingly, the valve is open as a result of a pressure in the upper range of pressures in which the system operates. Thus the excess air is permitted to pass out through the vent 41.

Whenever the pressure is low, as below 35 pounds in a system that has a cut-in pressure of 25 pounds and cut-out pressure of 45 pounds, the spring 35 will close the valve plug 24 against the seat 22 even though the float 28 is low enough to permit the valve to open.

When the level of water is higher than normal, the float 28 will be raised to lower the float arm 27 to the position of Figure 3 and the buoyancy of the float will keep the valve plug seated. Thus the air that enters the tank with each pumping stroke will remain in the tank and build up the necessary pnuematic head.

From the foregoing it is obvious that it takes a lower than normal water level plus air pressure in the upper range of the upper pressures for the water tank 12 to open the relief valve and permit escape of air. When either the water level is high or the air pressure is low there will be no escape. This is desirable from the standpoint of water level as it is only when the water level is low that the air should be permitted to escape. On the other hand, air should not be permitted to escape even though the water level is low if the pressure within the tank happens to be within the lower part of its range. Otherwise, it will interfere with proper displacement of water from the tank by the pneumatic head when a faucet is opened.

My disclosed air volume controlling device obviously requires the use of a single valve of relief type and a float so cooperating with it as to permit it to operate in its relief capacity when the water level is lower than desired. Reversely when the water level is lower than desired, relief of air is not permitted unless the air pressure within the tank exceeds a satisfactory operating value.

When it is desirable to renew either the valve seat 22 or the valve plug 24, the assembly of sleeve 21, cap nut 39, spring 35, adjusting screw 38 and spring followers 36 and 37 may be removed as a unit from the fitting F as shown in Figure 4. This will permit access to the valve plug and the valve seat which have both been removed from Figure 4 to illustrate such operation. The seat 22 and the plug 24 may then be renewed or cleaned as required and the sleeve, cap and spring assembly screwed back into position on the fitting with assurance that the seating of the spring has not been altered. Due to the flattened part 25 of the stem 23 cooperating with the forked part of the float lever 27 the stem is held against rotation while screwing or unscrewing the valve plug 24. The valve plug, it will be noted, is hexagon shape to permit free air passage and the corners of the plug are guided in the bore of the sleeve 21.

The relief valve construction illustrated permits ready renewal or inspection or cleaning of parts without in any way changing the seating of the valve.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. Means for relieving excessive air from a water supply tank having a pneumatic head therein comprising a fitting, a relief valve mounted therein and float operated means to retain said valve closed at any water level exceeding a predetermined maximum, said valve opening outwardly and having an interior head for engagement by said float operated means, said valve including a sleeve screwed into said fitting, a flat washer comprising combined gasket and valve seat between said sleeve and the fitting, a cap screwed into said sleeve, a spring in said cap, an adjusting screw carried by the outer end of said cap, said spring being interposed between said adjusting screw and said valve, and said valve being interposed between said spring and said washer and guided in said sleeve, said spring being removable with said sleeve and cap without changing the setting of the spring, said sleeve having a shoulder of less diameter than said spring for retaining the spring in said cap.

2. Means for relieving excessive air from a water supply tank having a pneumatic head therein comprising a fitting having a shouldered bore, a relief valve mounted therein and float operated means to retain said valve closed at any water level exceeding a predetermined maximum, said relief valve comprising a valve plug having a head for engagement by said float operated means, a stem for said valve plug and a sleeve mounted in said shouldered bore, said sleeve having a bore to guide said valve plug, a washer constituting a combined gasket and valve seat between said sleeve and the shoulder of said bore, a cap nut on said sleeve, an adjusting screw carried thereby, a spring within said cap nut and spring followers at the ends of said spring to be interposed between said adjusting screw and said valve, said valve plug being outside of said washer and being threaded on said stem for removal therefrom upon removal of said sleeve and cap nut from said shouldered bore of said fitting to release said washer.

BURTON E. SHAW.